July 15, 1958 R. E. DANNENBERG ET AL 2,843,341
AIRFOILS, VARIABLE PERMEABILITY MATERIAL
AND METHOD OF FABRICATION THEREOF
Filed Jan. 18, 1956 2 Sheets-Sheet 1

INVENTORS
ROBERT E. DANNENBERG
JAMES A. WEIBERG

BY [signature]
ATTORNEYS

INVENTORS
ROBERT E. DANNENBERG
JAMES A. WEIBERG
BY
George J. Rubens
ATTORNEYS

United States Patent Office 2,843,341

Patented July 15, 1958

1

2,843,341

AIRFOILS, VARIABLE PERMEABILITY MATERIAL AND METHOD OF FABRICATION THEREOF

Robert E. Dannenberg, Palo Alto, and James A. Weiberg, Menlo Park, Calif., assignors to the United States of America as represented by the Secretary of the Navy Application January 18, 1956, Serial No. 560,041

8 Claims. (Cl. 244—42)

(Granted under Title 35, U. S. Code (1952), sec. 266)

The invention described herein may be manufactured and used by or for the Government of the United States of America for governmental purposes without the payment of any royalties thereon or therefor.

The present invention relates to a variable permeability material and method of fabrication thereof and more particularly to a material having a substantially constant thickness wherein the permeability of the material varies accurately in a predetermined desired manner.

With the advent of present day high-speed aircraft, special problems have arisen with regard to controlling the flow of the boundary layer or air over an airfoil or body member. It has been known for sometime that it is desirable to employ area suction at certain locations on the exterior surface of airfoils of aircraft for the purpose of either preventing flow separation or stabilizing or removing the boundary layer. It has been found that it is usually advantageous to vary the air velocity distribution of the induced flow of air normal to and through the porous region of the airfoil in both chordwise and spanwise directions of such airfoils. Area suction systems have not, however, been commercially utilized due to the undesirable characteristics of the materials employed for providing variable permeability along the airfoil. This problem has been aggravated by the fact that high-speed aircraft employ thin airfoils which provide a minimum of available space and which require large variations in permeability in a relatively small area.

Prior variable permeability materials have proven unsatisfactory for a variety of reasons. One material which has been experimented with extensively is felt, which has the disadvantage of absorbing liquids such as gas thereby changing its permeability during operation. Furthermore, felt must be made in varying thickness in order to obtain varying permeability and thereby presents a structural limitation in attempting to mount it within a thin airfoil and to make it replaceable with other variable permeability members wherein the permeability varies in a different manner.

Sintered steel has also been employed experimentally as a variable permeability material but it is not satisfactory due to its high cost and excessive weight which make it commercially unfeasible. In addition, sintered steel has poor fatigue strength and cannot be formed with a varying permeability of the accuracy required in aircraft applications.

The invention material is very light in weight being formed of inorganic fibers which are nonporous, and consequently the material will not absorb fluids such as gas or the like. The finished material may be molded to shape easily and the density gradient may be varied in more than one direction with a high degree of accuracy thereby providing an accurate control over the permeability of the material. The invention material is also of a constant thickness whereby it may be easily installed and replaced in simple supporting structures.

Although the invention material is especially adapted

2 for use in boundary layer control application, it is apparent that it may be employed in any application where it is desired to have a material of substantially constant thickness and accurately controllable variable permeability, as for example in transpiration cooling systems, anti-icing systems, or filters where control or measurement of fluid flow is required.

An object of the present invention is to provide a variable permeability material of substantially constant thickness having a predetermined variable permeability.

Another object is to provide a variable permeability material which will not absorb fluids and in which the density gradient may be varied in more than one direction.

A further object of the invention is the provision of a variable permeability material which is light in weight and inexpensive, and yet which may be easily fabricated and is accurate and reliable in operation.

Other objects and many of the attendant advantages of this invention will be readily appreciated as the same becomes better understood by reference to the following detailed description when considered in connection with the accompanying drawings wherein.

The invention material is composed of a plurality of superimposed inorganic non-porous fibers formed, for example, of glass having a substantially constant diameter and being uniformly coated with a thermal setting bonding means such as phenolformaldehyde resin or the like. The material is initially manufactured in the form of a felted mass or mat by a process as disclosed for example in U. S. Patent No. 2,600,843. These thin layers of material may then be assembled as disclosed in the instant application to provide the desired permeability.

Figure 1:
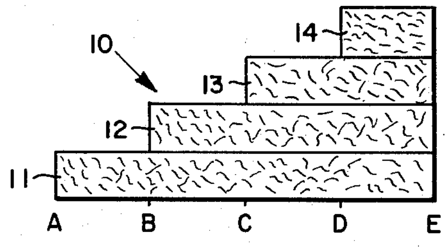
Fig. 1 illustrates an end view of an assembled body of material prior to compression and curing and employing a stepped permeability arrangement.

Referring now to the drawings, there is shown in Fig. 1 an assembled body member indicated generally by reference numeral 10 which comprises four layers 11, 12, 13 and 14 composed, for example, of glass fibers as disclosed in the aforementioned patent. It has been found that the permeability of the finished material is proportional to the density thereof, and accordingly it is apparent that by compressing and curing the body means shown in Fig. 1 into a body means of uniform thickness slightly less than that of layer 11, the density of the finished member will vary in a stepped arrangement as described hereinafter. In other words, if the portion of the finished body member between points A and B is assumed to have a density of one, the portion B—C will have a density of two, the portion C—D will have a density of three, and the portion D—E will have a density of four.

Figure 2:
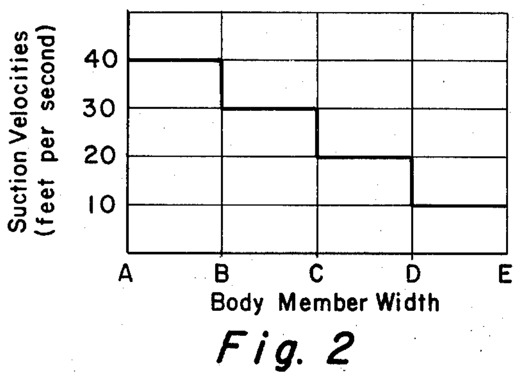
Fig. 2 is a graph illustrating the suction velocity vs. the body width characteristics of the body member shown in Fig. 1 after compression and curing.

This varying density is reflected in the chart shown in Fig. 2 whereby it becomes apparent that as the density increases across the width of the body member the suction velocity of the air moving normal to the surface of the body and through the various portions of the body member caused by a constant suction applied to one surface of the body member falls off substantially inversely proportional to the increase in density. It is therefore apparent that the permeability of the material is proportional to the density thereof and that in this manner by properly assembling the body member initially prior to compressing and heating thereof, the permeability of the finished material may be accurately controlled.

Figure 3:
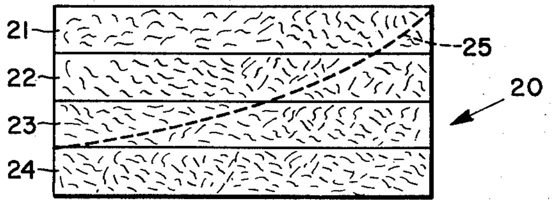
Fig. 3 illustrates an end view of an assembled body of material with a dotted line drawn thereon illustrating the desired sectional shape thereof prior to compression and curing.
Figure 4:
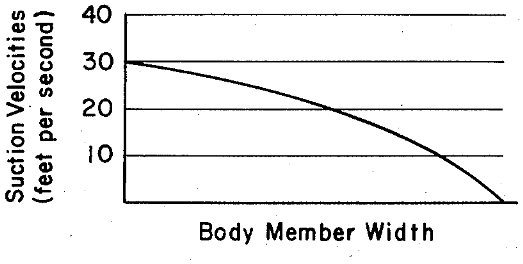
Fig. 4 is a graph of the suction velocity vs. body width characteristics of the body member shown in Fig. 3 after compression and curing.

Fig. 3 illustrates a body means indicated generally by reference numeral 20 composed of a plurality of layers 21, 22, 23, and 24. The desired permeability is determined experimentally and the required cross-sectional configuration of the body means prior to compressing and heating is calculated in a well-known manner and scribed on the side of the assembled body member as indicated by dotted line 25. The material above line 25 is then removed in any suitable manner such as cutting by a band saw, and the remaining portions of layers 21—24 are compressed and cured by heating as hereinafter described into a finished body member of substantially constant thickness. The distribution of the suction velocities obtained across the finished body member shown in Fig. 3 is illustrated in the graph of Fig. 4, and it is apparent that the permeability is accurately controlled in a tapered manner.

It is evident that by varying the initial sectional configuration of the assembled body member prior to compression and curing, the permeability of various sectional areas of the finished body member may be accurately controlled. Any desired permeability distribution may be obtained, and yet the finished body member may be maintained at a constant thickness. It should be noted that the permeability of the bodies shown in Figs. 1 and 3 have been varied in one direction only, but that the density of the longitudinal as well as the cross-sectional areas of the body may also be varied in a predetermined manner if desired.

After properly assembling and forming the body means as shown in Figs. 1 and 3 of the drawings, the body means is then inserted in a suitable mold and compressed to a constant thickness which is no greater than that of the least thickness of the body means prior to compression. The body means is then heated while in the mold such that the thermal setting bonding means is cured into an infusible solid causing a bonding between the fibers at the various points of contact such that when the pressure is released, the body means will retain the dimensions to which it has been compressed.

The body means is then removed from the mold and any excess material may be trimmed off in a suitable manner such as by means of a band saw. The finished product has a substantially constant thickness with a permeability that varies accurately in a predetermined manner.

Figures 5, 6:
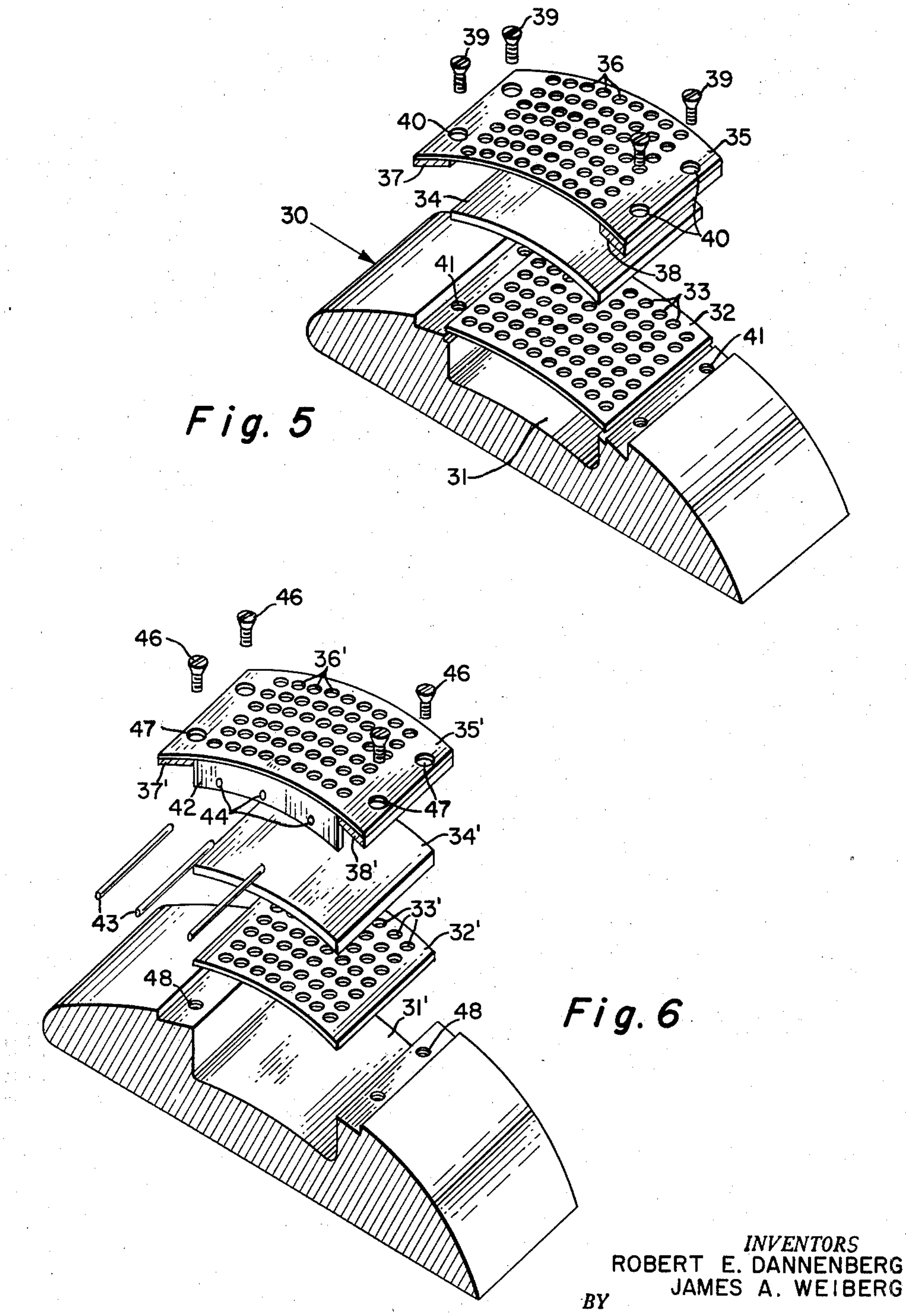
Fig. 5 is a sectional perspective exploded view of a portion of an airfoil utilizing the invention material.
Fig. 6 is a sectional perspective exploded view of a modification of the device shown in Fig. 5.

Fig. 5 illustrates an application of the invention material wherein it is employed in conjunction with an airfoil illustrated generally by reference numeral 30. Airfoil 30 has a conduit 31 formed therein through which suction is provided by means of a vacuum pump or the like. The upper portion of conduit 31 is closed by a rigid member 32 formed for example of steel, plastic, or the like which is suitably secured as by welding or bonding to the airfoil and has a plurality of openings 33 formed therethrough providing a vent from the conduit to atmosphere.

A variable permeability member 34 constructed in accordance with the present invention and having a substantially constant thickness has the lower surface thereof in engagement with the upper surface of rigid member 32 such that the inner surface of member 34 is adequately supported. A second rigid perforated member 35 similar to member 32 has a plurality of openings 36 formed therethrough, and the inner surface of member 35 engages the outer surface of member 34. Spacer members 37 and 38 formed of a rigid material such as steel, plastic, or the like are suitably secured to the inner surface of member 35 as by welding or bonding and extend longitudinally along the edges of member 35 and throughout the length thereof. Variable permeability member 34 is adapted to fit between spacer members 37 and 38, and members 34, 35 are secured in assembled position by means of screws 39 which pass through openings 40 formed in members 35, 37, 38 and which are threaded into suitably threaded openings 41 formed in the airfoil. It is apparent that when members 34 and 35 are in assembled position, spacer members 37 and 38 will form a seal preventing a transverse flow of air through the opposite edges of variable permeable member 34 adjacent to the spacer members, and accordingly air flow is restricted to a direction substantially normal to member 34. The seal between spacer members 37, 38 and the airfoil may be enhanced by providing a thin film of a suitable sealing compound between the mating surfaces thereof if desired.

When in assembled position, the outer surface of rigid member 35 is flush with the outer surface of the airfoil, and the assembly provides a compact arrangement wherein the variable permeability member 34 may be readily replaced and inspected when desired.

Fig. 6 illustrates a modification of the device shown in Fig. 5 wherein rigid perforated member 35′ which is similar to member 35 of Fig. 5 is provided at opposite ends thereof with inwardly extending flanges 42, only one of which is shown, and which extend downwardly into conduit 31′. Spacer members 37′ and 38′ similar to spacer members 37 and 38 of Fig. 5 are secured to the lower surface of member 35′ adjacent the opposite edges thereof. A second rigid member 32′ is adapted to extend within conduit 31′ and is maintained in position relative to member 35′ by a plurality of rods 43 which extend through openings 44 formed in flanges 42 at opposite ends of member 35′, the rods engaging the lower surface of rigid member 32′. Variable permeability member 34′ similar to member 34 of Fig. 5 is supported between the two rigid members in a manner similar to that of Fig. 5. The assembled unit comprising members 32′, 34′ and 35′ is secured in place on the airfoil by means of screws 46 which pass through openings 47 formed in members 35′, 37′, 38′ and which are threaded into suitably threaded openings 48 formed in the airfoil. The arrangement shown in Fig. 6 has the advantage that the entire assembly including the two rigid members and the variable permeability member may be removed as a unit allowing access to conduit 31′.

The structural arrangement shown in Fig. 6 may be modified by bonding variable permeability member 34′ directly to the inner surface of perforated member 35′, thereby eliminating flange 42, rods 43 and perforated member 32′. Such an arrangement is simpler and less expensive in construction, but is not as structurally rigid since the inner surface of the variable permeability member is no longer rigidly supported.

It is apparent that there is provided a variable permeability material of substantially constant thickness and having a predetermined variable permeability. The invention material will not absorb liquids, and the density gradient thereof may be varied in more than one direction. The material may be easily and cheaply fabricated and yet the material is accurate and reliable in operation.

Obviously many modifications and variations of the present invention are possible in the light of the above teachings. It is therefore to be understood that within the scope of the appended claims the invention may be practiced otherwise than as specifically described.

We claim:

1. A variable permeability member of generally sheet-like configuration and of predetermined thickness, which comprises a plurality of superimposed randomly deposited inorganic fibers of substantially constant diameter, each of said fibers being uniformly coated with a heat-curable bonding means, said fibers being bonded to one another at their points of contact, the density of said member in the thickness direction varying in a predetermined manner from one selected point to another along the surface thereof, while being of substantially uniform permeability from surface-to-surface at each point so selected.

2. A variable permeability member of generally flat configuration and of substantially constant thickness, which comprises a plurality of superimposed randomly deposited glass fibers of substantially constant diameter, each of said fibers being uniformly coated with a heat-curable resin, said fibers being bonded to one another at their points of contact, the density of said member in the thickness direction varying in a predetermined manner from one selected point to another along the surface thereof, while being of substantially uniform permeability from surface-to-surface at each point so selected.

3. A method of fabricating a variable permeability member of sheet-like configuration which comprises providing a plurality of superimposed randomly deposited inorganic fibers of substantially constant diameter, each of said fibers being uniformly coated with a heat-curable bonding means; assembling said fibers into a body having a predetermined varying sectional configuration; compressing said body to a predetermined thickness having no necessary relationship to the varying thicknesses of different sections of said body prior to compression; and heating the compressed body while retained at the predetermined thickness such that said bonding means is cured and said fibers are bonded at their points of contact to yield a member the permeability of which at any selected point on the surface thereof is constant from surface-to-surface in the thickness direction.

4. A method of fabricating a variable permeability member of sheet-like configuration which comprises providing a plurality of superimposed randomly deposited inorganic fibers of substantially constant diameter, each of said fibers being uniformly coated with a heat-curable resin; assembling said fibers into a body; removing a portion of said body such that said body has a predetermined varying sectional thickness; compressing said body to a substantially uniform thickness regardless of the varying thicknesses of different sections of said body prior to compression; and heating the compressed body while retained at the predetermined thickness such that said resin is cured and said fibers are bonded at their points of contact to yield a member the permeability of which at any selected point on the surface thereof is constant from surface-to-surface in the thickness direction.

5. A method of fabricating a variable permeability member of substantially planar configuration which comprises providing a plurality of relatively thin layers of glass fiber each fiber of which is coated with a heat-curable resin; assembling said layers in position above one another to form a relatively thicker body than each layer, removing a portion of said body such that said body has a predetermined varying sectional configuration; compressing said body to a predetermined thickness such that the density of the glass fibers is constant in the thickness direction at any one selected point on the surface of said body; and heating the compressed body while retained at the predetermined thickness such that said resin is cured and said fibers are bonded at their points of contact.

6. In combination, a body means having a conduit formed therein, vent means for providing communication between said conduit and atmosphere, a variable permeability member having an inner and an outer surface and being disposed adjacent to said vent means for controlling the fluid flow through said vent means, a rigid perforated member secured to said body means and having an inner and an outer surface, the inner surface of said rigid member engaging the outer surface of said variable permeability member for maintaining the latter member in position, said variable permeability member comprising a plurality of superimposed randomly deposited inorganic fibers of substantially constant diameter, each of said fibers being uniformly coated with a heat-curable bonding means, said fibers being bonded to one another at their points of contact, said variable permeability member being of a substantially constant thickness, the density of said variable permeability member having a particular uniform value in the thickness direction at any selected point on the surface thereof, and having different particular uniform values at other selected points on the said surface.

7. The combination as defined in claim 6 wherein said variable permeability member is bonded to said rigid perforated member.

8. In combination, a body means having a conduit formed therein, one wall of said conduit being defined by a first rigid perforated member, a second rigid perforated member spaced from said first rigid perforated member, means for securing said rigid members in operative relationship to one another, a sheet-like variable permeability member disposed between said rigid members and in engagement therewith, said variable permeability member comprising a plurality of superimposed randomly deposited inorganic fibers of substantially constant diameter, each of said fibers being uniformly coated with a heat-curable bonding means, said fibers being bonded to one another at their points of contact, the density of said variable permeability member being uniform from surface-to-surface in the thickness direction at any selected point on the surface thereof, the density of said member from surface-to-surface in the thickness direction also being of different values at different selected points on said surface.

References Cited in the file of this patent

UNITED STATES PATENTS

| | | |
|---|---|---|
| 2,539,768 | Anderson | Jan. 30, 1951 |
| 2,693,619 | Goss | Nov. 9, 1954 |
| 2,742,247 | Lachmann | Apr. 17, 1956 |
| 2,744,848 | Mottet | May 8, 1956 |